(12) United States Patent
Nemeth et al.

(10) Patent No.: US 12,038,496 B2
(45) Date of Patent: Jul. 16, 2024

(54) APPARATUS FOR SENSING A VEHICULAR ENVIRONMENT WHEN FITTED TO A VEHICLE

(71) Applicant: KNORR-BREMSE SYSTEME FUER NUTZFAHRZEUGE GMBH, Munich (DE)

(72) Inventors: Huba Nemeth, Budapest (HU); Viktor Tihanyi, Budapest (HU); Csaba Horvath, Biatorbagy (HU); Laszlo Danos, Pecs (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 245 days.

(21) Appl. No.: 16/326,799

(22) PCT Filed: Aug. 10, 2017

(86) PCT No.: PCT/EP2017/070385
§ 371 (c)(1),
(2) Date: Feb. 20, 2019

(87) PCT Pub. No.: WO2018/046228
PCT Pub. Date: Mar. 15, 2018

(65) Prior Publication Data
US 2019/0196001 A1    Jun. 27, 2019

(30) Foreign Application Priority Data

Sep. 8, 2016    (EP) .................................... 16187851

(51) Int. Cl.
*G01S 13/86*    (2006.01)
*G01S 13/87*    (2006.01)
(Continued)

(52) U.S. Cl.
CPC ............ *G01S 13/867* (2013.01); *G01S 13/87* (2013.01); *G01S 13/931* (2013.01);
(Continued)

(58) Field of Classification Search
None
See application file for complete search history.

(56) References Cited

U.S. PATENT DOCUMENTS

| 8,494,716 | B1 * | 7/2013 | Lee ....................... G05D 1/0246 |
| | | | 701/41 |
| 2005/0062615 | A1 * | 3/2005 | Braeuchle ............. G01S 13/867 |
| | | | 340/903 |

(Continued)

FOREIGN PATENT DOCUMENTS

| CN | 1602263 A | 3/2005 |
| CN | 101377675 A | 3/2009 |

(Continued)

OTHER PUBLICATIONS

International Search Report dated Nov. 20, 2017, of the corresponding International Application PCT/EP2017/070385 filed Aug. 10, 2017.

*Primary Examiner* — Maceeh Anwari
*Assistant Examiner* — Aarron E Santos
(74) *Attorney, Agent, or Firm* — NORTON ROSE FULBRIGHT US LLP; Gerard A. Messina

(57) ABSTRACT

An apparatus, fitted to a vehicle, for sensing a vehicular environment, includes acquiring with a first sensing circuit at least one first vehicular environment scene data. The first sensing circuit comprises at least one sensor, and is powered by a first power supply. A second sensing circuit is used to acquire at least one second vehicular environment scene data, and it comprises at least one sensor. The second sensing circuit is powered by a second power supply. The at least one first and second vehicular scene data is provided to (Continued)

a processing unit. The processing unit correspondingly determines first and second vehicular control data based on the first and second vehicular scene data. The first and second vehicular control data are each independently useable by a vehicle to automatically perform at least one safety maneuver comprising one or more of: braking; deceleration; movement to a slow lane or hard shoulder.

11 Claims, 8 Drawing Sheets

(51) Int. Cl.
    *G01S 13/931*     (2020.01)
    *G06V 10/143*     (2022.01)
    *G06V 20/56*     (2022.01)
    *G06V 20/58*     (2022.01)

(52) U.S. Cl.
    CPC ............ *G06V 10/143* (2022.01); *G06V 20/56* (2022.01); *G06V 20/58* (2022.01); *G01S 2013/9315* (2020.01); *G01S 2013/9318* (2020.01); *G01S 2013/93185* (2020.01); *G01S 2013/9319* (2020.01); *G01S 2013/93271* (2020.01); *G01S 2013/93274* (2020.01); *G01S 2013/93275* (2020.01); *G01S 2013/93276* (2020.01)

(56) References Cited

U.S. PATENT DOCUMENTS

| | | | | |
|---|---|---|---|---|
| 2006/0092073 A1* | 5/2006 | Boecker | ................ | G01S 13/931 342/70 |
| 2006/0158369 A1* | 7/2006 | Shinoda | ................... | H01Q 3/06 342/146 |
| 2008/0122597 A1* | 5/2008 | Englander | .............. | B60Q 1/525 348/E7.086 |
| 2010/0201508 A1 | 8/2010 | Green et al. | | |
| 2011/0098886 A1* | 4/2011 | Deng | ..................... | G08G 1/166 701/41 |
| 2014/0340516 A1 | 11/2014 | Vojtisek et al. | | |
| 2016/0033965 A1 | 2/2016 | Kopetz | | |
| 2016/0221575 A1* | 8/2016 | Posch | ................... | B60W 50/10 |

FOREIGN PATENT DOCUMENTS

| | | | | |
|---|---|---|---|---|
| CN | 103440689 A | * | 12/2013 | |
| CN | 104057950 A | * | 9/2014 | |
| CN | 104428826 A | | 3/2015 | |
| CN | 104950740 A | | 9/2015 | |
| CN | 204978415 U | | 1/2016 | |
| CN | 105358396 A | | 2/2016 | |
| CN | 105549591 A | | 5/2016 | |
| CN | 105699964 A | | 6/2016 | |
| CN | 105711569 A | | 6/2016 | |
| CN | 105738871 A | | 7/2016 | |
| CN | 105857315 A | | 8/2016 | |
| CN | 107580201 A | * | 1/2018 | |
| DE | 102006049879 A1 | | 4/2008 | |
| DE | 102006049879 A1 | * | 4/2008 | ............. G01S 13/36 |
| DE | 102014213171 A1 | | 10/2015 | |
| DE | 102014213171 A1 | * | 10/2015 | ........... G05D 1/0077 |
| EP | 2107504 A1 | | 10/2009 | |
| EP | 2168835 A1 | | 3/2010 | |
| EP | 2168835 A1 | * | 3/2010 | ................ B60T 7/22 |
| EP | 2631696 A2 | | 8/2013 | |
| WO | 2014/138765 A1 | | 9/2014 | |
| WO | WO-2014138765 A1 | * | 9/2014 | ....... H04L 12/40182 |

* cited by examiner

APPARATUS FOR SENSING A VEHICULAR ENVIRONMENT WHEN FITTED TO A VEHICLE

FIELD OF THE INVENTION

The present invention relates to an apparatus for sensing a vehicular environment when fitted to a vehicle, to a vehicle configured to sense a vehicular environment, and to a method for sensing a vehicular environment.

BACKGROUND INFORMATION

The autonomous operation of transport vehicles is a new field of inventions. More sophisticated functions require high-end hardware (HW) infrastructure including different type of sensors and perception technologies. SAE Automation level 2 systems require the presence and attention of the driver. Level 3 systems should manage autonomous driving without the continuous attention of the driver. Information relating to SAE Automation levels can be found at http://www.sae.org/misc/pdfs/automated_driving.pdf.

Patent document EP2168835A1 relates to systems and methods for autonomous control of a vehicle include interruptible, behavior-based, and selective control. Autonomous control is achieved by using actuators that interact with input devices in the vehicle. The actuators (e.g., linkages) manipulate the input devices (e.g., articulation controls and drive controls, such as a throttle, brake, tie rods, steering gear, throttle lever, or accelerator) to direct the operation of the vehicle, and can be considered to be control of vehicle functions. Although operating autonomously, manual operation of the vehicle is possible following the detection of events that suggest manual control is desired. Subsequent autonomous control may be permitted, permitted after a prescribed delay, or prevented. Systems and methods for processing safety signals and/or tracking terrain features are also utilized by an autonomous vehicle.

Therefore, it would be advantageous to have an improved technology for sensing a vehicular environment, thereby enabling the safe control and maneuvering of vehicles.

SUMMARY OF THE INVENTION

An object of the present invention may be solved with the subject matter of the independent claims, wherein further embodiments are incorporated in the dependent claims. It should be noted that the following described aspects of the invention apply also for the apparatus for sensing a vehicular environment, vehicle configured to sense a vehicular environment and the method for sensing a vehicular environment.

In a first aspect, there is provided an apparatus for sensing a vehicular environment when fitted to a vehicle, the apparatus comprising:

a first sensing circuit;

a second sensing circuit; and a processing unit.

The first sensing circuit comprises at least one sensor, and the second sensing circuit comprises at least one sensor. The first sensing circuit is powered by a first power supply, and the second sensing circuit is powered by a second power supply. The first sensing circuit is configured to acquire at least one first vehicular environment scene data, and the second sensing circuit is configured to acquire at least one second vehicular environment scene data. The first sensing circuit is configured to provide the at least one first vehicular scene data to the processing unit, and the second sensing circuit is configured to provide the at least one second vehicular scene data to the processing unit. The processing unit is configured to determine first vehicular control data on the basis of the first vehicular scene data, and the processing unit is configured to determine second vehicular control data on the basis of the second vehicular scene data; wherein, the first vehicular control data and the second vehicular control data are each independently useable by a vehicle to automatically perform at least one safety maneuver comprising one or more of: braking; deceleration; movement to a slow lane or hard shoulder.

In other words, the apparatus has two sensing circuits that are independently powered, with data from each separately enabling a processor to provide suitable data for a vehicle to automatically perform a safety maneuver, such as an emergency stop, slowing down, or pulling off the highway or moving from a fast lane to a slower lane. By having the circuits separately powered redundancy is provided, where the safety maneuver can be performed if either of the circuits fails, which could result from sensors in that circuit failing or power loss to that circuit or data from that circuit being corrupted in some form.

To put this another way, scene data from either sensing circuit is sufficient, when processed, to enable a vehicle to automatically perform a safety maneuver. Thus, for example data is provided by either sensing system that enables a vehicle to safely pull off the road, to perform an emergency stop, or to slow down.

In an example, the first vehicular control data is useable by the vehicle to perform at least one maneuver in addition to the at least one safety maneuver.

In other words, the first sensing circuit can be considered to be a main sensing circuit, that provides data to the processing unit that once processed is useable by a vehicle to automatically perform all necessary highway functions. To put this another way, the first sensing circuit can provide data that enables a vehicle to drive in an autonomous manner. A secondary less sophisticated sensing circuit can be provided on a separate power circuit, which provides data enabling the vehicle to perform a safety maneuver and therefore the vehicle can perform a necessary safety maneuver if either sensing circuit fails, and does so in a cost effective manner because only one circuit is required to provide data for fully autonomous driving.

In an example, the second vehicular control data is only useable by the vehicle to perform the at least one safety maneuver.

In other words, a relatively unsophisticated second sensing circuit is provided, that only enables a vehicle to perform a safety maneuver. This means that if either the first circuit or second circuit fails, the vehicle can still perform a safety maneuver because the circuits are independently powered, and can do so in a cost effective manner because the second circuit has functionality that only allows the safety maneuver to be carried out and will be less expensive than a sensing circuit that enables fully autonomous driving, including all the necessary highway functions.

In an example, the processing unit is configured to determine third vehicular control data on the basis of a sensor status of the at least one sensor of the first sensing circuit; and wherein the processing unit is configured to determine fourth vehicular control data on the basis of a sensor status of the at least one sensor of the second sensing circuit; and the third vehicular control data and the fourth vehicular control data are each independently useable by a vehicle to initiate performance of the at least one safety maneuver.

In other words, if it is determined that a sensor or sensors of the first sensing system has or have failed or if it is determined that a sensor or sensors of the second sensing system has or have failed, the processor can initiate a safety maneuver that is performed using data provided by the other sensing system. Thus, a vehicle is able to safely perform a safety maneuver as soon as it is established that only one sensor circuit is operational in terms of providing scene data. This mitigates problems if the second sensing circuit was to fail soon after the first, because the vehicle can already have safely performed the safety maneuver such as performing an emergency stop or pulling off the road.

In an example, the processing unit is configured to determine fifth vehicular control data on the basis of a power status of the first sensing circuit; and wherein the processing unit is configured to determine sixth vehicular control data on the basis of a power status of the second sensing circuit; and the fifth vehicular control data and the sixth vehicular control data are each independently useable by a vehicle to initiate performance of the at least one safety maneuver.

In other words, if it is determined that the first power supply to the first sensing system has failed or if it is determined that the second power supply to the second sensing system has failed, the processor can initiate a safety maneuver that is performed using scene data provided by the other sensing system. Thus, a vehicle is able to safely perform a safety maneuver as soon as it is established that only one sensor circuit is operational in terms of providing scene data. This mitigates problems if the second sensing circuit was to fail soon after the first, because the vehicle can already have safely performed the safety maneuver such as performing an emergency stop or pulling of the road.

In an example, the processing unit is configured to determine first scene information on the basis of the first vehicular scene data, and the processing unit is configured to determine second scene information on the basis of the second vehicular scene data; and wherein the first vehicular control data is determined on the basis of the first scene information, and the second vehicular control data is determined on the basis of the second scene information.

In this manner, scene data can be processed that enables the vehicle to perform a safety maneuver, that accounts for objects within the environment around the vehicle. In this way, the vehicle can safely come to a stop or pull off the road or pull up to the side of the road whilst taking into account, other vehicles, pedestrians, the road layout including for example curvatures in the road. Also, because the apparatus can determine the position of another vehicle, person or animal, such as a dog, the apparatus on the basis of data acquired by either sensing circuit can perform a safety maneuver. Thus, if a child steps into the road, or a car in front performs an emergency stop, or the processing of other scene data indicates that the vehicle should perform a safety maneuver this can be done safely even if scene data is not being acquired from one of the sensing circuits.

In an example, the first sensing circuit comprises at least one forward looking radar, and the second sensing circuit comprises at least one forward looking radar.

In other words, the vehicular environment scene data comprises radar data. In an example, the processing unit is configured to process the radar data to determine the scene data, such as the location of objects, information relating to the identity of objects, the location of the road side, and in-lane object detection. By having forward looking radar sensors in each sensing circuit, scene data can be acquired even in bad weather conditions.

In this manner, all weather functionality is provided and day and night operability is enhanced, where a safety maneuver can be carried out even if one of the sensing circuits fails or otherwise stops providing scene data.

In an example, the first sensing circuit comprises at least one forward looking camera, and the second sensing circuit comprises at least one forward looking camera.

In other words, the vehicular environment scene data comprises image data. In an example, the processing unit is configured to process the image data to determine the scene data, such as the location of objects, information relating to the identity of objects, the location of the road side. In an example, image processing is used to determine the scene information. In an example, the camera is a visible camera. In other words, the camera can sense rays in the visible frequency range, like photographic cameras. In an example, the camera is an infrared camera. In other words, the camera can sense rays in the infrared frequency range. In an example, the infrared camera has an integrated lighting element and therefore can enhance operation during the night, but in other examples the infrared camera does not have such an integrated lighting element. The infrared camera may have a lower color resolution than a visible camera, however the skilled will appreciate what type of camera to use and indeed a visible camera and an infrared camera can be used together, which could be integrated into a single camera.

In this manner, scene information can be processed to determine the identity of objects with high degrees of confidence, such as determining that a person is stood by the edge of the road and that it is not a mailbox at that location, and the safety maneuver can be carried out in a similar fashion to that carried out by a skilled and experienced driver, because it can be carried on the basis of data that is similar to that a human processes in order to carry out such a safety maneuver.

In other words, the at least one first vehicular environment scene data comprises image data, and the at least one second vehicular environment scene data comprises image data. In this manner, such image data can be processed to determine for example lane marking and vehicle positioning in the roadway, and object detection is provided. This data can be used, from either sensing circuit independently, to effectively carry out a safety maneuver even if one of the sensing circuits fails or otherwise stops providing scene data.

In an example, the first sensing circuit comprises at least one side looking radar and/or at least one rear looking radar, and the second sensing circuit comprises at least one side looking radar and/or at least one rear looking radar.

By having side looking radars, which can be wide angle side looking radars, detection of and monitoring of objects in the neighbouring lanes in close proximity of the vehicle is provided. This enables the safety maneuver to be carried out, even if one of the sensor circuits fails.

By having rear looking radars, which can be far field rear looking radars, object detection and monitoring of objects in the rear far field of the vehicle is provide, even in bad weather conditions and at day and night. This further enhances the ability to carry out the safety maneuver, even if one of the sensor circuits fails.

In an example, the first sensing circuit comprises at least one rearward looking camera and/or at least one downward looking camera, and the second sensing circuit comprises at least one rearward looking camera and/or at least one downward looking camera.

By having rearward looking cameras, object detection and monitoring is provided in the neighbouring lanes and behind the vehicle in the far field. This further enhances the ability to carry out the safety maneuver, even if one of the sensor circuits fails.

By having downward looking cameras, object detection and monitoring can be provided at the front corners of the vehicle in the direct proximity of the vehicle, that may not be fully covered by sensors such as forward looking far field cameras or forward looking far field radars. This further enhances the ability to carry out the safety maneuver, even if one of the sensor circuits fails.

In the above, in some examples a pair of radar sensors is provided. In this manner, all weather functionality is provided and day and night operability is enhanced, and redundancy is provided because if one radar fails continuity of operability is maintained. In this way by having two sensors, the apparatus can handle the situation when one of the sensors malfunctions or goes offline, enabling the continued provision of information that can enable a minimal risk safety maneuver to be carried out even after such a partial malfunction.

In the above, in some examples a pair of camera sensors is provided. In this manner, the identity of objects can be determined with high confidence, and redundancy is provided because if one camera fails continuity of operability is maintained.

In a second aspect, there is provided a vehicle configured to sense a vehicular environment comprising:
an apparatus for sensing a vehicular environment according to the first aspect;
a vehicle control system.

The apparatus is configured to cooperate with the vehicle control system to control the vehicle to perform at least one safety maneuver.

In this way, a vehicle is provided with an enhanced highway operation control and collision avoidance, that can perform a safety maneuver even when one sensor circuit fails.

In this manner, on the basis of control data provided by the processing unit, the vehicle can be automatically decelerated and/or stopped and/or turn off the road and/or pull in to the side of the road or perform other safety maneuvers, and can do this even when failure of one sensor circuit occurs.

In a third aspect, there is provided a method for sensing a vehicular environment, comprising:
a) acquiring with a first sensing circuit at least one first vehicular environment scene data, wherein the first sensing circuit comprises at least one sensor, and wherein the first sensing circuit is powered by a first power supply;
b) acquiring with a second sensing circuit at least one second vehicular environment scene data, wherein the second sensing circuit comprises at least one sensor, and wherein the second sensing circuit is powered by a second power supply;
c) providing to a processing unit the at least one first vehicular scene data;
d) providing to the processing unit the at least one second vehicular scene data;
e) determining with the processing unit first vehicular control data on the basis of the first vehicular scene data;
f) determining with the processing unit second vehicular control data on the basis of the second vehicular scene data; and
wherein, the first vehicular control data and the second vehicular control data are each independently useable by a vehicle to automatically perform at least one safety maneuver comprising one or more of: braking; deceleration; movement to a slow lane or hard shoulder.

The above aspects and examples will become apparent from and be elucidated with reference to the embodiments described hereinafter.

Exemplary embodiments will be described in the following with reference to the following drawings.

DETAILED DESCRIPTION

Figure 1:
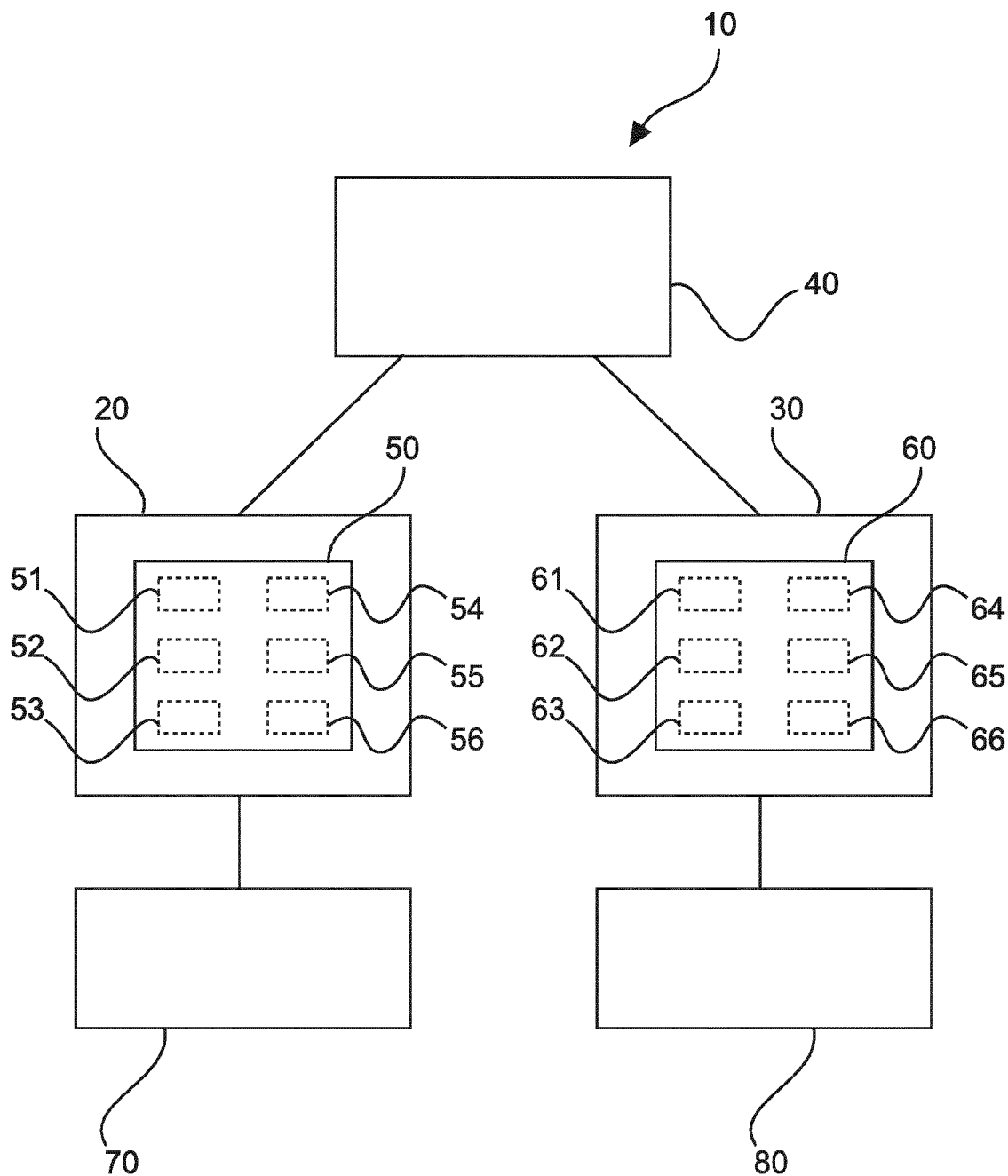
FIG. 1 shows a schematic representation of an example of an apparatus for sensing a vehicular environment when fitted to a vehicle.

FIG. 1 shows an apparatus 10 for sensing a vehicular environment when fitted to a vehicle 100. The apparatus 10 comprises a first sensing circuit 20, a second sensing circuit 30, and a processing unit 40. The first sensing circuit 20 comprises at least one sensor 50. The second sensing circuit 30 comprises at least one sensor 60. The first sensing circuit is powered by a first power supply 70. The second sensing circuit 30 is powered by a second power supply 80. The first sensing circuit 20 is configured to acquire at least one first vehicular environment scene data, and the second sensing circuit 30 is configured to acquire at least one second vehicular environment scene data. The first sensing circuit 20 is configured to provide the at least one first vehicular scene data to the processing unit 40. This is done via wired or wireless communication. The second sensing circuit 30 is configured to provide the at least one second vehicular scene data to the processing unit 40. This is done via wired or wireless communication. The processing unit 40 is configured to determine first vehicular control data on the basis of the first vehicular scene data, and the processing unit 40 is configured to determine second vehicular control data on the basis of the second vehicular scene data. The first vehicular control data and the second vehicular control data are each independently useable by the vehicle 100 to automatically perform at least one safety maneuver comprising one or more of: braking; deceleration; movement to a slow lane or hard shoulder.

In an example, the first power supply is a battery. In an example, the second power supply is a battery. In an example, the first power supply is configured to power the at least one sensor of the first sensing circuit. In an example, the second power supply is configured to power the at least one sensor of the second sensing circuit. In an example, the first power supply can be a generator. In an example, the second power supply can be a generator. In an example, the first power supply is formed from a battery and a generator. In this example, a first battery can be used to provide power when the internal combustion engine is not running. However, when the internal combustion engine is running a first generator powered from the engine can be used to provide power and power need not be taken from the battery. Similar the second power supply can be formed from a second battery and a second generator.

According to an example, the first vehicular control data is useable by the vehicle to perform at least one maneuver in addition to the at least one safety maneuver.

In an example, the at least one maneuver in addition to the at least one safety maneuver comprises one or more of: in-lane maneuvers; between-lane maneuvers; positioning of the vehicle with respect to lane markings; positioning of the vehicle with respect to the road side; positioning of the vehicle with respect to other vehicles; negotiating corners; overtaking.

According to an example, the second vehicular control data is only useable by the vehicle to perform the at least one safety maneuver.

According to an example, the processing unit is configured to determine third vehicular control data on the basis of a sensor status of the at least one sensor of the first sensing circuit. The processing unit is also configured to determine fourth vehicular control data on the basis of a sensor status of the at least one sensor of the second sensing circuit. The third vehicular control data and the fourth vehicular control data are each independently useable by a vehicle to initiate performance of the at least one safety maneuver.

According to an example, the processing unit is configured to determine fifth vehicular control data on the basis of a power status of the first sensing circuit. The processing unit is also configured to determine sixth vehicular control data on the basis of a power status of the second sensing circuit. The fifth vehicular control data and the sixth vehicular control data are each independently useable by a vehicle to initiate performance of the at least one safety maneuver.

According to an example, the processing unit is configured to determine first scene information on the basis of the first vehicular scene data, and the processing unit is configured to determine second scene information on the basis of the second vehicular scene data. The first vehicular control data is then determined on the basis of the first scene information, and the second vehicular control data is then determined on the basis of the second scene information.

In an example, the determined scene information relates to information on objects within a field of view of the at least one sensor of the first sensing circuit and/or within a field of view of the at least one sensor of the second sensing circuit. In an example, the determined scene information relates to the position of an object or the positions of objects within the field of view of the at least one sensor of the first sensing circuit and/or within the field of view of the at least one sensor of the second sensing circuit. In an example, the determined scene information relates to the identification of an object or objects in the field of view of the at least one sensor of the first sensing circuit and/or within the field of view of the at least one sensor of the second sensing circuit.

In an example, performance of the safety maneuver involves the application of brakes and/or the reduction of input to an accelerator pedal, and/or the application of steering direction changes.

In an example, the determined scene information relates to the position of a side of the road with respect to the vehicle. In an example, the determined scene information relates to the position of road markings with respect to the vehicle.

In this manner, the apparatus can ensure that the safety maneuver is carried out in a safe and controlled fashion.

According to an example, the first sensing circuit comprises at least one forward looking radar 51, and the second sensing circuit comprises at least one forward looking radar 61.

In an example, the at least one forward looking radar of the first sensing circuit is configured to acquire the scene data when mounted at the front driver's side of a vehicle. In an example, the at least one forward looking radar of the first sensing circuit is configured to acquire the scene data when mounted at the front non-driver's side of a vehicle. In other words, the radar can be positioned at a front corner of vehicle in order to provide fields of view that are relatively unblocked by objects ahead.

In an example, the at least one forward looking radar of the second sensing circuit is configured to acquire the scene data when mounted at the front driver's side of a vehicle. In an example, the at least one forward looking radar of the second sensing circuit is configured to acquire the scene data when mounted at the front non-driver's side of a vehicle. In other words, the radar can be positioned at a front corner of vehicle in order to provide fields of view that are relatively unblocked by objects ahead.

In an example, the at least one forward looking radar of the first sensing circuit is configured to acquire the scene data when mounted at the front driver's side of a vehicle, and the at least one forward looking radar of the second sensing circuit is configured to acquire the scene data when mounted at the front non-driver's side of a vehicle. In an example, the at least one forward looking radar of the first sensing circuit is configured to acquire the scene data when mounted at the front non-driver's side of a vehicle, and the at least one forward looking radar of the second sensing circuit is configured to acquire the scene data when mounted at the front driver's side of a vehicle. In other words, the radars can be positioned at a front corner of vehicle in order to provide fields of view that are relatively unblocked by objects ahead, and in normal operation where both circuits are operational the scene ahead can be viewed more effectively without blockages.

In an example, the forward looking radars are far field forward looking radars.

According to an example, the first sensing circuit comprises at least one forward looking camera 52, and the second sensing circuit comprises at least one forward looking camera 62.

In an example, the at least one forward looking camera of the first sensing circuit is configured to acquire the scene data when mounted at the front driver's side of a vehicle. In an example, the at least one forward looking camera of the first sensing circuit is configured to acquire the scene data when mounted at the front non-driver's side of a vehicle. In other words, the camera can be positioned at a front corner of vehicle in order to provide fields of view that are relatively unblocked by objects ahead.

In an example, the at least one forward looking camera of the second sensing circuit is configured to acquire the scene data when mounted at the front driver's side of a vehicle. In an example, the at least one forward looking camera of the second sensing circuit is configured to acquire the scene data when mounted at the front non-driver's side of a vehicle. In other words, the camera can be positioned at a front corner of vehicle in order to provide fields of view that are relatively unblocked by objects ahead.

In an example, the at least one forward looking camera of the first sensing circuit is configured to acquire the scene data when mounted at the front driver's side of a vehicle, and the at least one forward looking camera of the second sensing circuit is configured to acquire the scene data when mounted at the front non-driver's side of a vehicle. In an example, the at least one forward looking camera of the first sensing circuit is configured to acquire the scene data when mounted at the front non-driver's side of a vehicle, and the at least one forward looking camera of the second sensing circuit is configured to acquire the scene data when mounted at the front driver's side of a vehicle. In other words, the cameras can be positioned at a front corner of vehicle in order to provide fields of view that are relatively unblocked by objects ahead, and in normal operation where both circuits are operational the scene ahead can be viewed more effectively without blockages.

In an example, the at least one forward looking sensor comprises a radar sensor and comprises a camera sensor. In this manner, all weather functionality is provided and day and night operability is enhanced, and at the same time the identity of objects can be determined with high degrees of confidence, further enhancing the ability to carry out a safety maneuver even if a sensing circuit fails.

In an example, the forward looking cameras are far field forward looking cameras.

According to an example, the first sensing circuit comprises at least one side looking radar 53 and/or at least one rear looking radar 54, and the second sensing circuit comprises at least one side looking radar 63 and/or at least one rear looking radar 64.

In an example, the at least one side looking radar is configured to be mounted to the side of a vehicle.

In an example, the at least rear side looking radar is configured to be mounted to the side of a vehicle or to the rear of the vehicle or to the front of the vehicle.

According to an example, the first sensing circuit comprises at least one rearward looking camera 55 and/or at least one downward looking camera 56, and the second sensing circuit comprises at least one rearward looking camera 65 and/or at least one downward looking camera 66.

In an example, the rearward looking cameras of either circuit are far field rearward looking cameras. In examples, the rearward looking cameras can be mounted to the front, side or rear of the vehicle.

In an example, the downward looking cameras of either circuit are wide angle cameras, such as fisheye lens downward looking corner cameras. In examples, the downward looking cameras can be mounted to the front, side or rear of the vehicle.

In an example, any of the cameras discussed with respect to FIG. 1 can be a visible camera and/or an infrared camera.

In an example, the apparatus is fitted to a vehicle.

Figure 2:
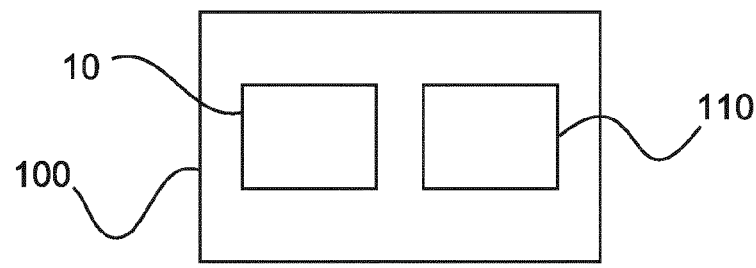
FIG. 2 shows a schematic representation of an example of a vehicle configured to sense a vehicular environment.

FIG. 2 shows a vehicle 100 configured to sense a vehicular environment. The vehicle 100 comprises an apparatus 10 for sensing a vehicular environment as described with reference to FIG. 1. The vehicle 100 also comprises a vehicle control system 110. The apparatus 10 is configured to cooperate with the vehicle control system 110 to control the vehicle 100 to perform at least one safety maneuver.

In an example, the vehicle control system is configured to apply inputs to a braking system and/or apply inputs to an accelerator/decelerator system and/or apply inputs to a steering system.

In an example, the processing unit 10 carries out the functions of the vehicle control unit 110.

Figure 3:
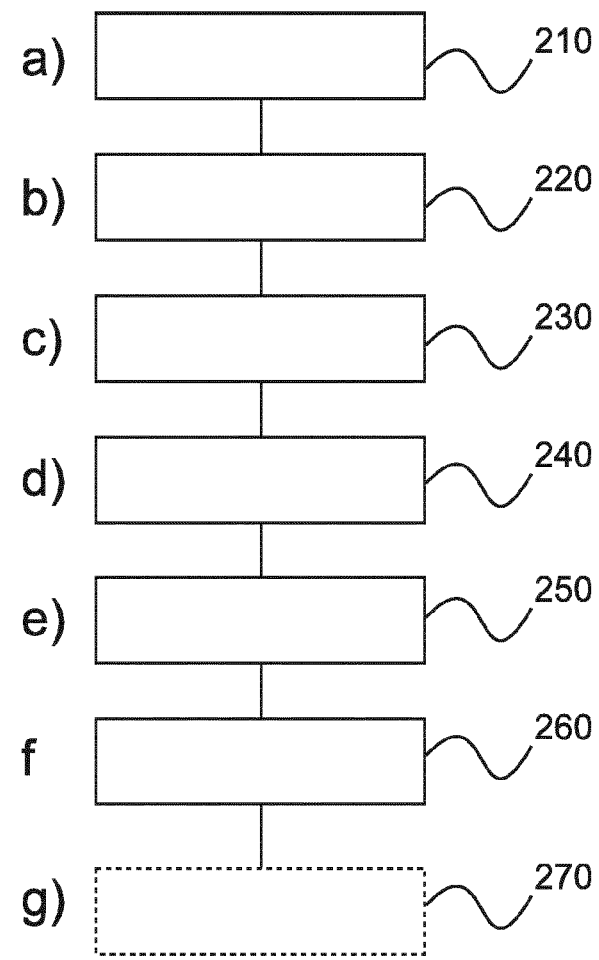
FIG. 3 shows a method for sensing a vehicular environment.

FIG. 3 shows a method 200 for sensing a vehicular environment in its basic steps. The method comprises:

in an acquiring step 210, also referred to as step a), acquiring with a first sensing circuit 20 at least one first vehicular environment scene data, wherein the first sensing circuit comprises at least one sensor 50, and wherein the first sensing circuit is powered by a first power supply 70;

in an acquiring step 220, also referred to as step b), acquiring with a second sensing circuit 30 at least one second vehicular environment scene data, wherein the second sensing circuit comprises at least one sensor 60, and wherein the second sensing circuit is powered by a second power supply 80;

in a providing step 230, also referred to as step c), providing to a processing unit 40 the at least one first vehicular scene data;

in a providing step 240, also referred to as step d), providing to the processing unit the at least one second vehicular scene data;

in a determining step 250, also referred to as step e), determining 250 with the processing unit first vehicular control data on the basis of the first vehicular scene data;

in a determining step 260, also referred to as step f), determining with the processing unit second vehicular control data on the basis of the second vehicular scene data.

The first vehicular control data and the second vehicular control data are then each independently useable by a vehicle 100 to automatically perform at least one safety maneuver comprising one or more of: braking; deceleration; movement to a slow lane or hard shoulder.

In an example where the method is being carried out for a vehicle 100, the method comprises step g), which is using 270 the first vehicular control data or the second vehicular control data to automatically perform at least one safety maneuver comprising one or more of: braking; deceleration; movement to a slow lane or hard shoulder.

The apparatus, vehicle and method that address this are now further described with reference to FIG. 4, FIG. 5, FIG. 6, FIG. 7, FIG. 8, and FIG. 9.

Figure 4:
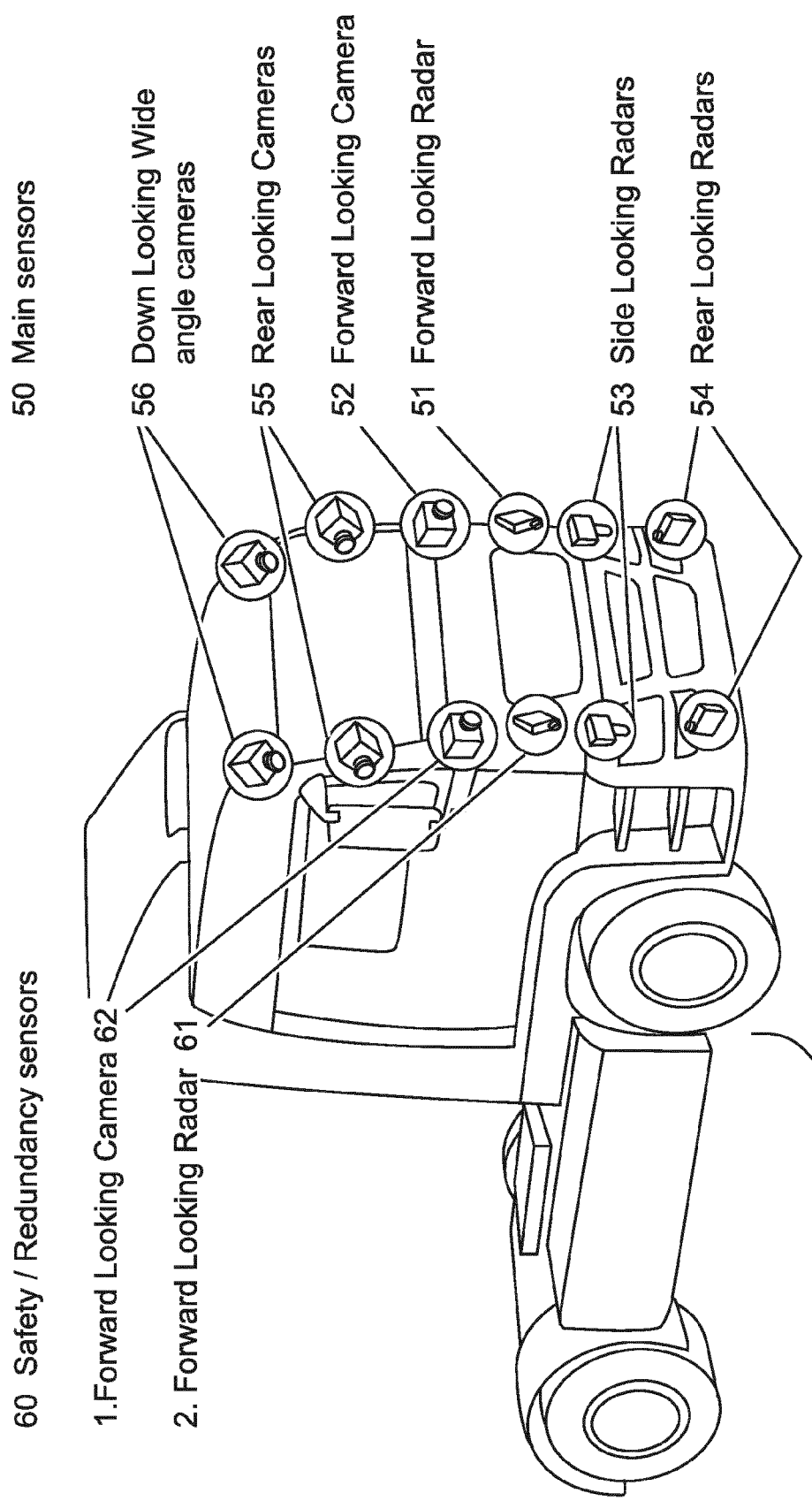
FIG. 4 shows a schematic representation of an example of a vehicle configured to sense a vehicular environment.
Figure 5:
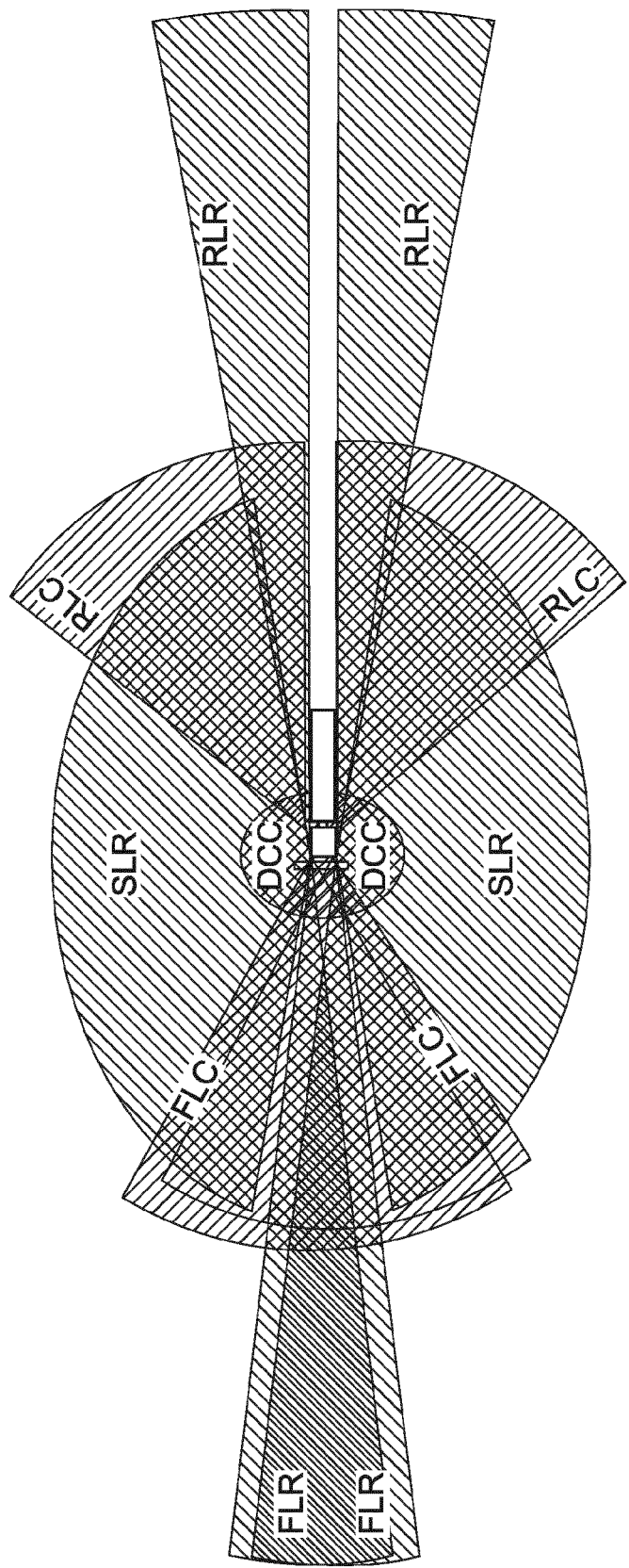
FIG. 5 shows a representation of the fields of view for sensors for the vehicle shown in FIG. 4.

FIG. 4 shows a possible placement of environment sensor clusters and FIG. 5 shows the field of view of the sensors. The main supply circuit sensor suite includes sensors for covering all the necessary highway functions, including in lane maneuvers and any kind lane changes. Reference numbers of the sensors shown in FIG. 4 are also described above with respect to FIG. 1. While the safety or redundancy circuit sensors as shown only cover functions for in lane minimal risk maneuvers such as in lane deceleration or in lane stop of the vehicle or deceleration, or pulling to a stop by the side of the road, or moving from a fast lane to a slower lane as part of the safety maneuver or pulling onto a hard shoulder. A safety or redundancy circuit sensor suite is shown, however this sensor suite could if necessary have the same functionality as the main circuit sensor suite.

The following sensors are used in the main circuit (see FIG. 4 and FIG. 5):

Far field Forward Looking Camera (FLC) for lane marking and in lane object detection, Far field Forward Looking Radar (FLR) for in lane object detection especially in bad weather conditions, Wide angle Side Looking Radars (SLR) at each side of the vehicle for monitoring and object detection in the neighboring lanes in the close proximity of the motor vehicle or vehicle combination, Far field Rear Looking Camera (RLC) for monitoring and object detection in the neighboring lanes in the far field of the motor vehicle or vehicle combination, Far field Rear Looking Radar (RLR) for monitoring and object detection in the neighboring lanes in the far field of the motor vehicle or vehicle combination especially in bad weather conditions, Optionally fisheye lens Downward looking Corner Cameras (DCC) can be added to the front corners of the motor vehicle for monitoring and object detection in the front direct proximity for the vehicle not covered by front far field sensors FLC and FLR.

For redundancy purpose the following sensors are doubled and connected to a separate battery supply circuit (see FIG. 4 and FIG. 5):

Far field Forward Looking Camera (FLC) for lane marking and in lane object detection, Far field Forward Looking Radar (FLR) for in lane object detection especially in bad weather conditions.

Figure 6:
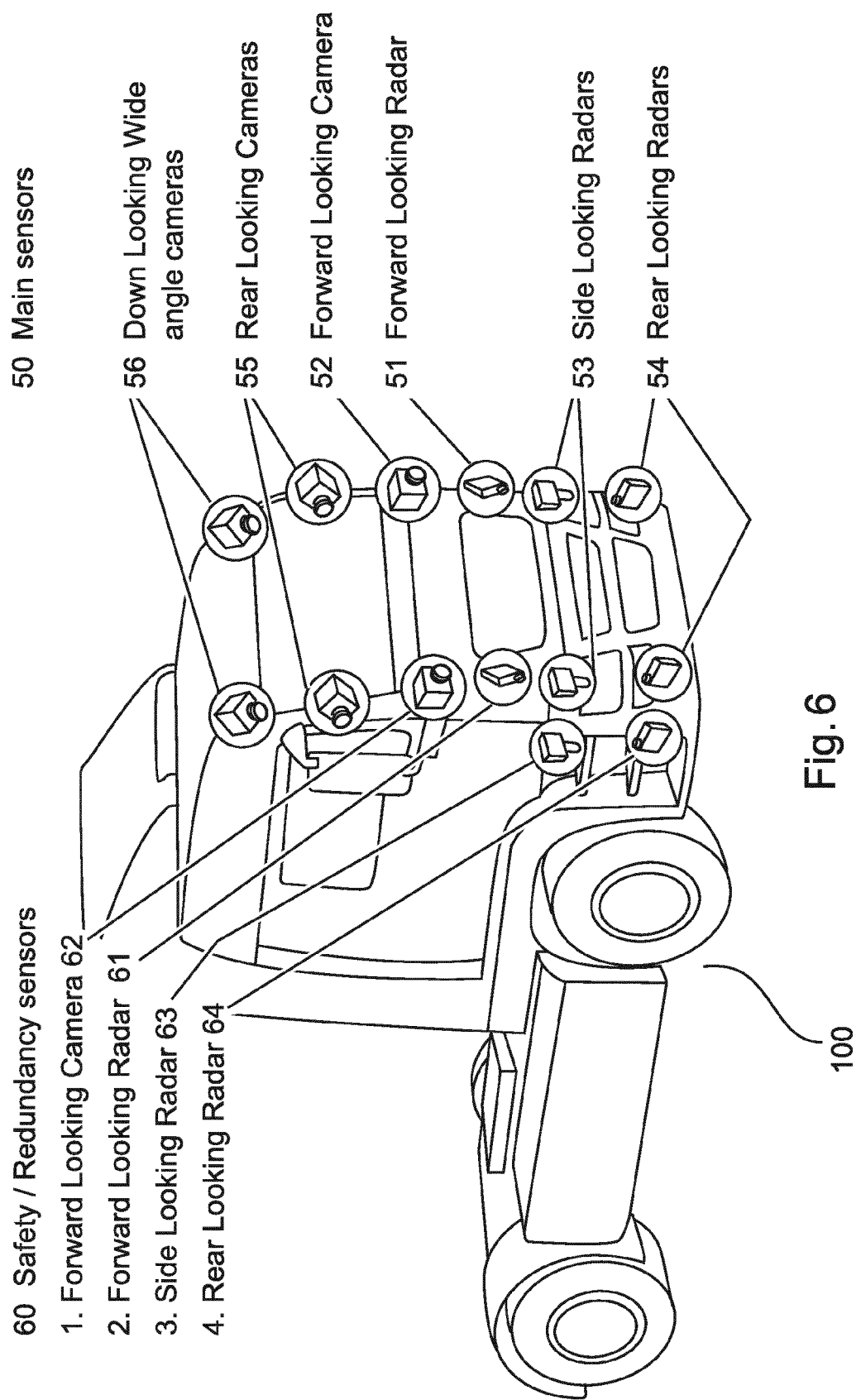
FIG. 6 shows a schematic representation of an example of a vehicle configured to sense a vehicular environment.
Figure 7:
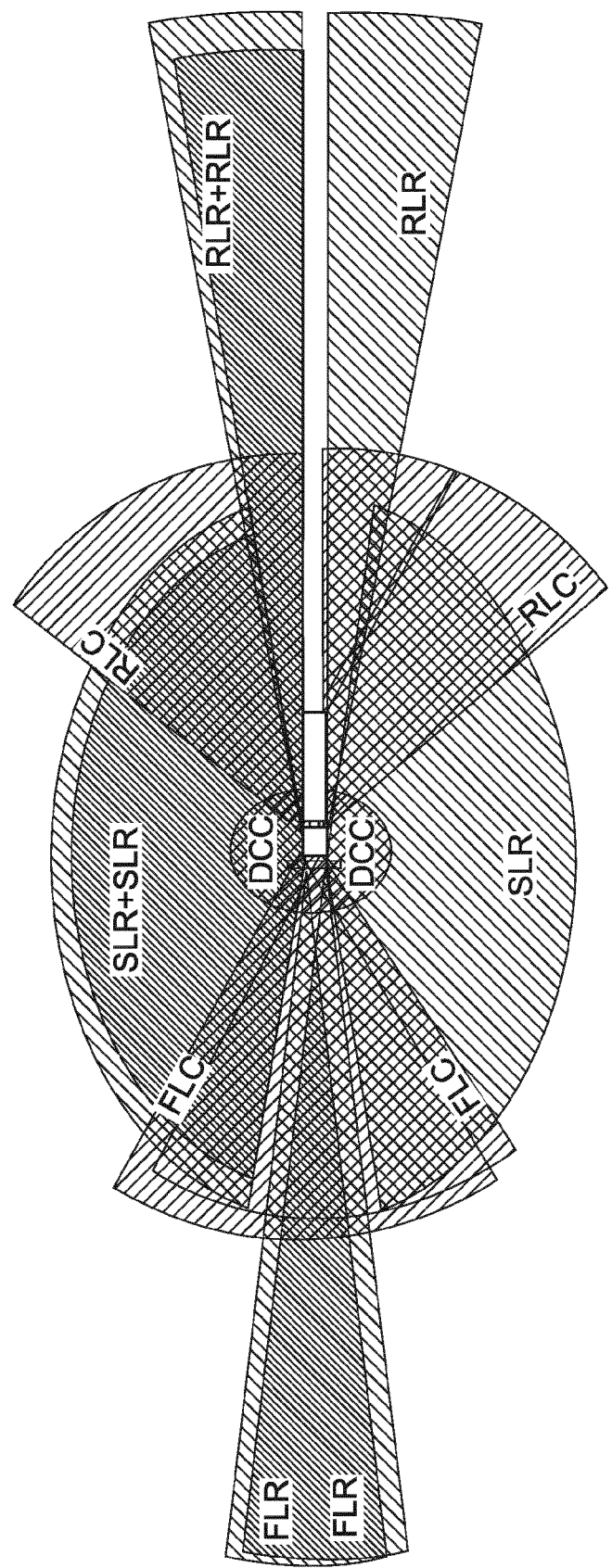
FIG. 7 shows a representation of the fields of view for sensors for the vehicle shown in FIG. 6.

FIG. 6 shows another possible placement of environment sensor clusters and FIG. 7 shows the field of view of the sensors. The main circuit has the same sensor arrangement as the main circuit shown in FIG. 4, however the redundancy circuit has additional sensors in order to be able to provide a non-driver-side direction lane change minimal risk maneuver in a greater number of situations than that shown for the sensor arrangement of FIG. 4 and FIG. 5.

In FIG. 6 and FIG. 7, for redundancy purposes, the following sensors are additionally doubled compared to that shown in FIG. 4 and FIG. 5:

Wide angle Side Looking Radars (SLR) at the non-driver side of the vehicle for monitoring and object detection in the neighboring lanes in the close proximity of the motor vehicle or vehicle combination, Far field Rear Looking Radar (RLR) at the non-driver side of the vehicle for monitoring and object detection in the neighboring lanes in the far field of the motor vehicle or vehicle combination especially in bad weather conditions.

Figure 8:
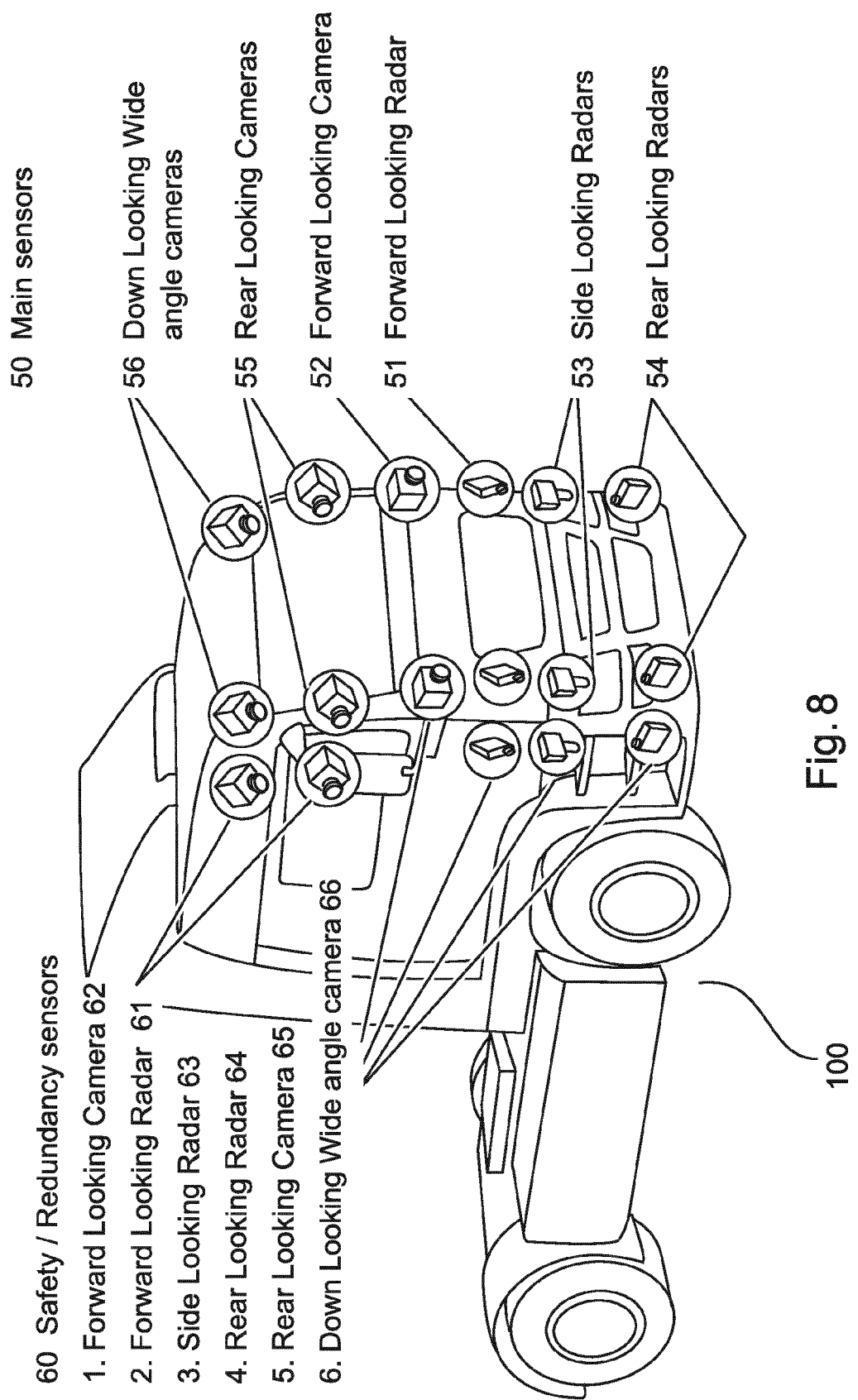
FIG. 8 shows a schematic representation of an example of a vehicle configured to sense a vehicular environment.
Figure 9:
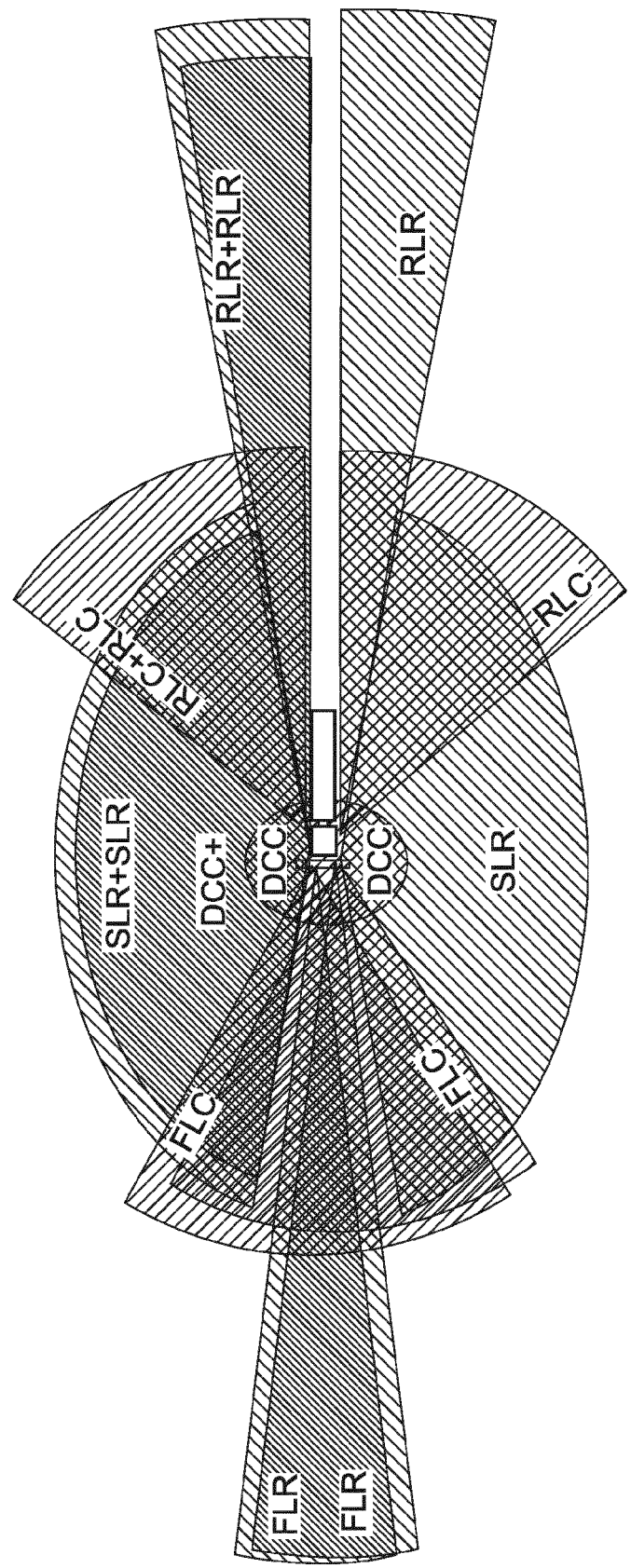
FIG. 9 shows a representation of the fields of view for sensors for the vehicle shown in FIG. 8.

FIG. 8 shows another possible placement of environment sensor clusters and FIG. 9 shows the field of view of the sensors. The main circuit has the same sensor arrangement as the main circuit shown in FIG. 4 and FIG. 6, however the redundancy circuit has additional sensors in order to be able to provide a non-driver-side direction lane change minimal risk maneuver in a greater number of situations than that shown for the sensor arrangement of FIG. 6 and FIG. 7.

In FIG. 8 and FIG. 9, for redundancy purposes, the following sensors are additionally doubled compared to that shown in FIG. 6 and FIG. 7:

Far field Rear Looking Camera (RLC) at the non-driver side of the vehicle for monitoring and object detection in the neighboring lanes in the far field of the motor vehicle or vehicle combination, Optionally fisheye lens Downward looking Corner Camera (DCC) at the non-driver side of the vehicle to the front corner of the motor vehicle for monitoring and object detection in the front direct proximity for the vehicle not covered by front far field sensors FLC and FLR.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

THE LIST OF REFERENCE NUMBERS IS AS FOLLOWS

10 Apparatus for sensing a vehicular environment;
20 A first sensing circuit;
30 A second sensing circuit;
40 A processing unit;
50 At least one sensor of the first sensing circuit;
51 At least one forward looking radar of the first sensing circuit;
52 At least one forward-looking camera of the first sensing circuit;
53 At least one side looking radar of the first sensing circuit;
54 At least one rear looking radar of the first sensing circuit;
55 At least one rearward looking camera of the first sensing circuit;
56 At least one downward looking camera of the first sensing circuit;
60 At least one sensor of the second sensing circuit;
61 At least one forward looking radar of the second sensing circuit;
62 At least one forward-looking camera of the second sensing circuit;
63 At least one side looking radar of the second sensing circuit;
64 At least one rear looking radar the second sensing circuit;
65 At least one rearward looking camera of the second sensing circuit;
66 At least one downward looking camera of the second sensing circuit;
70 A first power supply;
80 A second power supply;
100 A vehicle configured to sense a vehicular environment;
110 A vehicle control system;
200 A method for sensing a vehicular environment;
210 Acquiring with a first sensing circuit at least one first vehicular environment scene data;
220 Acquiring with a second sensing circuit at least one second vehicular environment scene data;
230 Providing to a processing unit the at least one first vehicular scene data;

240 Providing to the processing unit the at least one second vehicular scene data;

250 Determining with the processing unit first vehicular control data;

260 Determining with the processing unit second vehicular control data;

270 using the first vehicular control data or the second vehicular control data to automatically perform at least one safety maneuver.

The invention claimed is:

1. An apparatus for sensing a vehicular environment of a vehicle, comprising:
a first sensing circuit;
a second sensing circuit; and
a processing means for determining vehicular control data based on at least one first vehicular environment scene data, and for determining further vehicular control data based on at least one second vehicular environment scene data;
wherein, the first sensing circuit includes at least one sensor,
wherein, the second sensing circuit includes at least one sensor,
wherein, the first sensing circuit is powered by a first power supply,
wherein, the second sensing circuit is powered by a second power supply,
wherein, the first sensing circuit acquires the at least one first vehicular environment scene data, and the second sensing circuit acquires the at least one second vehicular environment scene data,
wherein, the first sensing circuit provides the at least one first vehicular scene data to the processing means, and the second sensing circuit is configured to provide the at least one second vehicular scene data to the processing means,
wherein, the first vehicular control data and the second vehicular control data are each independently useable by a vehicle to automatically perform at least one safety maneuver including at least one of: braking, deceleration, and/or movement to a slow lane or a hard shoulder,
wherein the at least one sensor of the first sensing circuit includes a Far field Forward Looking Camera (FLC) providing lane marking and in lane object detection, a Far field Forward Looking Radar (FLR) providing in lane object detection, including in bad weather conditions, a Wide angle Side Looking Radars (SLR) at each side of the vehicle providing monitoring and object detection in the neighboring lanes in the close proximity of the motor vehicle or vehicle combination, a Far field Rear Looking Camera (RLC) providing monitoring and object detection in the neighboring lanes in the far field of the motor vehicle or vehicle combination, and a Far field Rear Looking Radar (RLR) providing monitoring and object detection in the neighboring lanes in the far field of the motor vehicle or vehicle combination in bad weather conditions,
wherein the at least one sensor of the second sensing circuit includes another Far field Forward Looking Camera (FLC) providing lane marking and in lane object detection, another Far field Forward Looking Radar (FLR) providing in lane object detection, including in bad weather conditions, another Wide angle Side Looking Radars (SLR) at each side of the vehicle providing monitoring and object detection in the neighboring lanes in the close proximity of the motor vehicle or vehicle combination, another Far field Rear Looking Camera (RLC) providing monitoring and object detection in the neighboring lanes in the far field of the motor vehicle or vehicle combination, and another Far field Rear Looking Radar (RLR) providing monitoring and object detection in the neighboring lanes in the far field of the motor vehicle or vehicle combination, including in bad weather conditions,
wherein the processing means determines further vehicular control data, including third vehicular control data based on a sensor status of the at least one sensor of the first sensing circuit, and fourth vehicular control data based on a sensor status of the at least one sensor of the second sensing circuit; and wherein the third vehicular control data and the fourth vehicular control data are each independently useable by a vehicle to initiate performance of the at least one safety maneuver, including at least one of: braking, deceleration, and/or movement to the slow lane or the hard shoulder,
wherein when it is determined that the first power supply to the first sensing system has failed or when it is determined that the second power supply to the second sensing system has failed, the processing means initiates the at least one safety maneuver that is performed using scene data provided by the other sensing system, so that the vehicle is able to safely perform the at least one safety maneuver when it is established that only one sensor circuit is operational to provide scene data, so as to reduce problems when the second sensing circuit fails after the first sensing circuit, because the vehicle already has safely performed the at least one safety maneuver,
wherein the first sensing circuit includes at least one fisheye downward looking corner camera, and the second sensing circuit includes at least one fisheye downward looking corner camera, so that object detection and monitoring are provided at the front corners of the vehicle in a direct proximity of the vehicle not covered by the FLCs and the FLRs,
all weather functionality is provided and day and night operability is enhanced, where the at least one safety maneuver can be carried out even when one of the sensing circuits fails or otherwise stops providing scene data, and
wherein the first sensing circuit, including different types of sensors, operates as a main sensor system to provide the at least one first vehicular environment scene data to the processing means, wherein processed first vehicular environment scene data is usable by the vehicle to automatically perform all highway functions, and wherein the second sensing circuit, which is a less sophisticated sensor that only enables the vehicle to perform the at least one safety maneuver, and wherein the second vehicular control data is independently useable by the vehicle to automatically perform only the at least one safety maneuver.

2. The apparatus of claim 1, wherein the first vehicular control data is useable by the vehicle to perform at least one maneuver in addition to the at least one safety maneuver.

3. The apparatus of claim 1, wherein the second vehicular control data is only useable by the vehicle to perform the at least one safety maneuver.

4. The apparatus of claim 1, wherein the processing means determines further vehicular control data, including fifth vehicular control data based on a power status of the first sensing ciruit, and sixth vehicular control data based on a power status of the second sensing circuit; and wherein the fifth vehicular control data and the sixth vehicular control data are each independently useable by a vehicle to initiate performance of the at least one safety maneuver, including at least one of: braking, deceleration, and/or movement to the slow lane or the hard shoulder.

5. The apparatus of claim 1, wherein the processing means determines first scene information based on the first vehicular scene data, and determines second scene information based on the second vehicular scene data, and wherein the first vehicular control data is determined based on the first scene information, and the second vehicular control data is determined based on the second scene information.

6. The apparatus of claim 1, wherein the first sensing circuit includes at least one forward looking radar, and the second sensing circuit includes at least one forward looking radar.

7. The apparatus of claim 1, wherein the first sensing circuit includes at least one forward looking camera, and the second sensing circuit includes at least one forward looking camera.

8. The apparatus of claim 1, wherein the first sensing circuit includes at least one side looking radar and/or at least one rear looking radar, and the second sensing circuit includes at least one side looking radar and/or at least one rear looking radar.

9. The apparatus of claim 1, wherein the first sensing circuit includes at least one rearward looking camera, and the second sensing circuit includes at least one rearward looking camera.

10. A vehicle, comprising:
a vehicle control system; and
an apparatus for sensing a vehicular environment of the vehicle, including:
  a first sensing circuit;
  a second sensing circuit; and
  a processing means for determining first vehicular control data based on at least one first vehicular environment scene data, and for determining second vehicular control data based on at least one second vehicular environment scene data;
  wherein, the first sensing circuit includes at least one sensor,
  wherein, the second sensing circuit includes at least one sensor,
  wherein, the first sensing circuit is powered by a first power supply,
  wherein, the second sensing circuit is powered by a second power supply,
  wherein, the first sensing circuit is configured to acquire the at least one first vehicular environment scene data, and the second sensing circuit is configured to acquire the at least one second vehicular environment scene data,
  wherein, the first sensing circuit is configured to provide the at least one first vehicular scene data to the processing means, and the second sensing circuit is configured to provide the at least one second vehicular scene data to the processing means,
  wherein, the first vehicular control data and the second vehicular control data are each independently useable by a vehicle to automatically perform at least one safety maneuver including at least one of: braking, deceleration, and/or movement to a slow lane or a hard shoulder, and
  wherein, the apparatus is configured to cooperate with the vehicle control system to control the vehicle to perform the at least one safety maneuver,
  wherein the at least one sensor of the first sensing circuit includes a Far field Forward Looking Camera (FLC) providing lane marking and in lane object detection, a Far field Forward Looking Radar (FLR) providing in lane object detection, including in bad weather conditions, a Wide angle Side Looking Radars (SLR) at each side of the vehicle providing monitoring and object detection in the neighboring lanes in the close proximity of the motor vehicle or vehicle combination, a Far field Rear Looking Camera (RLC) providing monitoring and object detection in the neighboring lanes in the far field of the motor vehicle or vehicle combination, and a Far field Rear Looking Radar (RLR) providing monitoring and object detection in the neighboring lanes in the far field of the motor vehicle or vehicle combination in bad weather conditions,
  wherein the at least one sensor of the second sensing circuit includes another Far field Forward Looking Camera (FLC) providing lane marking and in lane object detection, another Far field Forward Looking Radar (FLR) providing in lane object detection, including in bad weather conditions, another Wide angle Side Looking Radars (SLR) at each side of the vehicle providing monitoring and object detection in the neighboring lanes in the close proximity of the motor vehicle or vehicle combination, another Far field Rear Looking Camera (RLC) providing monitoring and object detection in the neighboring lanes in the far field of the motor vehicle or vehicle combination, and another Far field Rear Looking Radar (RLR) providing monitoring and object detection in the neighboring lanes in the far field of the motor vehicle or vehicle combination, including in bad weather conditions,
  wherein when it is determined that the first power supply to the first sensing system has failed or when it is determined that the second power supply to the second sensing system has failed, the processing means initiates at least one safety maneuver that is performed using scene data provided by the other sensing system, so that the vehicle is able to safely perform at least one safety maneuver when it is established that only one sensor circuit is operational to provide scene data, so as to reduce problems when the second sensing circuit fails after the first sensing circuit, because the vehicle already has safely performed the at least one safety maneuver,
  wherein the first sensing circuit includes at least one fisheye downward looking corner camera, and the second sensing circuit includes at least one fisheye downward looking corner camera, so that object detection and monitoring are provided at the front corners of the vehicle in a direct proximity of the vehicle not covered by the FLCs and the FLRs,
  all weather functionality is provided and day and night operability is enhanced, where the at least one safety maneuver can be carried out even when one of the sensing circuits fails or otherwise stops providing scene data, and
  wherein the first sensing circuit, including different types of sensors, operates as a main sensor system to provide the at least one first vehicular environment scene data to the processing means, wherein processed first vehicular environment scene data is usable by the vehicle to automatically perform all highway functions, and wherein the second sensing circuit, which is a less sophisticated sensor that only enables the vehicle to perform the at least one safety maneuver, and wherein the second vehicular control data is independently useable by the vehicle to automatically perform only the at least one safety maneuver.

11. A method for sensing a vehicular environment, the method comprising:
acquiring, with a first sensing circuit, at least one first vehicular environment scene data,
wherein the first sensing circuit includes at least one sensor, and wherein the first sensing circuit is powered by a first power supply;
acquiring, with a second sensing circuit, at least one second vehicular environment scene data, wherein the second sensing circuit includes at least one sensor, and wherein the second sensing circuit is powered by a second power supply;
providing the at least one second vehicular scene data to a processing means;
providing the at least one first vehicular scene data to the processing means for performing the following steps:
determining first vehicular control data based on the first vehicular scene data; and
determining second vehicular control data based on the second vehicular scene data;
wherein, the first vehicular control data and the second vehicular control data are each independently useable by a vehicle to automatically perform at least one safety maneuver including at least one of: braking, deceleration, and/or movement to a slow lane or hard shoulder,
wherein the at least one sensor of the first sensing circuit includes a Far field Forward Looking Camera (FLC) providing lane marking and in lane object detection, a Far field Forward Looking Radar (FLR) providing in lane object detection, including in bad weather conditions, a Wide angle Side Looking Radars (SLR) at each side of the vehicle providing monitoring and object detection in the neighboring lanes in the close proximity of the motor vehicle or vehicle combination, a Far field Rear Looking Camera (RLC) providing monitoring and object detection in the neighboring lanes in the far field of the motor vehicle or vehicle combination, and a Far field Rear Looking Radar (RLR) providing monitoring and object detection in the neighboring lanes in the far field of the motor vehicle or vehicle combination, including in bad weather conditions,
wherein the at least one sensor of the second sensing circuit includes another Far field Forward Looking Camera (FLC) providing lane marking and in lane object detection, another Far field Forward Looking Radar (FLR) providing in lane object detection, including in bad weather conditions, another Wide angle Side Looking Radars (SLR) at each side of the vehicle providing monitoring and object detection in the neighboring lanes in the close proximity of the motor vehicle or vehicle combination, another Far field Rear Looking Camera (RLC) providing monitoring and object detection in the neighboring lanes in the far field of the motor vehicle or vehicle combination, and another Far field Rear Looking Radar (RLR) providing monitoring and object detection in the neighboring lanes in the far field of the motor vehicle or vehicle combination, including in bad weather conditions,
wherein when it is determined that the first power supply to the first sensing system has failed or when it is determined that the second power supply to the second sensing system has failed, the processing means initiates at least one safety maneuver that is performed using scene data provided by the other sensing system, so that the vehicle is able to safely perform the at least one safety maneuver when it is established that only one sensor circuit is operational to provide scene data, so as to reduce problems when the second sensing circuit fails after the first sensing circuit, because the vehicle already has safely performed the at least one safety maneuver,
wherein the first sensing circuit includes at least one fisheye downward looking corner camera, and the second sensing circuit includes at least one fisheye downward looking corner camera, so that object detection and monitoring are provided at the front corners of the vehicle in a direct proximity of the vehicle not covered by the FLCs and the FLRs,
all weather functionality is provided and day and night operability is enhanced, where the at least one safety maneuver can be carried out even when one of the sensing circuits fails or otherwise stops providing scene data, and
wherein the first sensing circuit, including different types of sensors, operates as a main sensor system to provide the at least one first vehicular environment scene data to the processing means, wherein processed first vehicular environment scene data is usable by the vehicle to automatically perform all highway functions, and wherein the second sensing circuit, which is a less sophisticated sensor that only enables the vehicle to perform the at least one safety maneuver, and wherein the second vehicular control data is independently useable by the vehicle to automatically perform only the at least one safety maneuver.

* * * * *